(12) United States Patent
Theios et al.

(10) Patent No.: US 8,900,679 B2
(45) Date of Patent: *Dec. 2, 2014

(54) HIGH R-VALUE WINDOW UNIT

(71) Applicant: Guardian Industries Corp., Auburn Hills, MI (US)

(72) Inventors: Jason E. Theios, Toledo, OH (US); Vijayen S. Veerasamy, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/742,586

(22) Filed: Jan. 16, 2013

(65) Prior Publication Data

US 2013/0129944 A1 May 23, 2013

Related U.S. Application Data

(62) Division of application No. 11/317,234, filed on Dec. 27, 2005, now Pat. No. 8,377,524.

(51) Int. Cl.
| | |
|---|---|
| *E06B 3/00* | (2006.01) |
| *E06B 3/66* | (2006.01) |
| *E06B 3/677* | (2006.01) |
| *E06B 3/663* | (2006.01) |
| *E06B 5/00* | (2006.01) |
| *B32B 17/00* | (2006.01) |

(52) U.S. Cl.
CPC . *E06B 5/00* (2013.01); *E06B 3/677* (2013.01); *E06B 3/66304* (2013.01); *E06B 3/6612* (2013.01); *Y02B 80/24* (2013.01); *B32B 17/00* (2013.01)
USPC ........ 428/34; 52/204.6; 52/204.7; 52/204.74; 52/786.1; 52/786.13

(58) Field of Classification Search
CPC ............... E06B 1/04; E06B 1/36; E06B 3/24; E06B 3/2675; E06B 3/6612; E06B 3/66304; E06B 3/677; E06B 5/00; Y02B 80/24
USPC ................... 428/34; 52/204.6, 204.69, 204.7, 52/204.71, 204.705, 786.1, 786.13
See application file for complete search history.

(56) References Cited

U.S. PATENT DOCUMENTS 3,667,179 A * 6/1972 Eisenberg ........................ 52/209
3,875,706 A 4/1975 Okawa
(Continued)

FOREIGN PATENT DOCUMENTS

| DE | 25 06 332 | 8/1976 |
|---|---|---|
| GB | 1 511 922 | 5/1978 |
| WO | WO 94/24398 | 10/1994 |

OTHER PUBLICATIONS

U.S. Appl. No. 11/317,234, filed Dec. 27, 2005; Theios et al.

(Continued)

*Primary Examiner* — Donald J Loney
(74) *Attorney, Agent, or Firm* — Nixon & Vanderhye P.C.

(57) ABSTRACT

In certain example embodiments of this invention, a window unit may include a vacuum IG (VIG) unit as an inboard lite and a monolithic lite (e.g., with an optional low-E coating thereon) as an outboard lite. A dead air space may separate the inboard and outboard lites. A highly insulated frame may be used to support the inner and outer lites. The VIG unit may be partially embedded or supported in the insulative frame, so that the insulating frame separates the VIG unit inboard lite from the outboard lite thereby reducing conductivity around the edges of the window unit so that R-value can be increased (and U-value decreased). In certain example embodiments, the total R-value of the window unit is at least about R-8, and more preferably at least about R-10 (compared to the much lower R-values of conventional IG units).

3 Claims, 6 Drawing Sheets

(56) References Cited

U.S. PATENT DOCUMENTS

| | | | |
|---|---|---|---|
| 4,019,295 A | 4/1977 | Derner et al. | |
| 4,114,342 A | 9/1978 | Okawa | |
| 4,173,668 A | 11/1979 | Hentzelt et al. | |
| 4,512,334 A | 4/1985 | Peachey | |
| 4,683,154 A * | 7/1987 | Benson et al. | 428/34 |
| 4,928,448 A | 5/1990 | Phillip | |
| 5,270,084 A | 12/1993 | Parker | |
| 6,105,336 A | 8/2000 | Katoh et al. | |
| 6,336,984 B1 | 1/2002 | Aggas | |
| 6,365,242 B1 | 4/2002 | Veerasamy | |
| 6,372,312 B1 | 4/2002 | Aggas | |
| 6,399,169 B1 | 6/2002 | Wang et al. | |
| 6,420,002 B1 | 7/2002 | Aggas et al. | |
| 6,447,692 B1 | 9/2002 | Momoda et al. | |
| 6,497,931 B1 | 12/2002 | Aggas | |
| 6,613,404 B2 | 9/2003 | Johnson | |
| 6,692,600 B2 | 2/2004 | Veerasamy et al. | |
| 6,860,079 B2 | 3/2005 | Schwarz | |
| 6,886,297 B1 | 5/2005 | Crandell | |
| 6,936,347 B2 | 8/2005 | Laird et al. | |
| 6,955,026 B2 | 10/2005 | Misonou | |
| 6,968,888 B2 | 11/2005 | Kolowich | |
| 6,971,443 B2 | 12/2005 | Kung et al. | |
| 8,377,524 B2 * | 2/2013 | Theios et al. | 428/34 |
| 2004/0188124 A1 | 9/2004 | Stark | |
| 2005/0081462 A1 | 4/2005 | Mulford et al. | |
| 2005/0081981 A1 | 4/2005 | Heikkila | |
| 2005/0193656 A1 * | 9/2005 | Kownacki | 52/213 |

OTHER PUBLICATIONS

Supplementary European Search Report dated Apr. 7, 2011.
News Release Oct. 25-26, 2004 Journalists and Scientists in Dialogue—Energy Management, "Phase Change Materials—Latent Heat Storage for Interior Climate Control", Schmidt (pp. 1-9).
Environmental Engineering, Fraunhofer Magazine Jan. 2004, "Storing Heat With Wax" (pp. 36-37).

* cited by examiner

ABSTRACT# HIGH R-VALUE WINDOW UNIT

This application is a divisional of application Ser. No. 11/317,234 filed Dec. 27, 2005, the entire disclosure of which is hereby incorporated herein by reference in this application.

This application relates to a window unit designed so as to have a high R-value. In certain example embodiments, the window unit includes a vacuum IG (VIG) unit. In certain example embodiments, the design may result in a higher and thus improved R-value for the window unit(s).

BACKGROUND AND SUMMARY OF THE INVENTION

It is known in the art that R-value is a measure of the insulating characteristics of a window. In particular, R-value is the reciprocal of U-value. In other words, U value=1/R-value. The term U-value or U-factor (synonymous with thermal transmittance) is well understood in the art and is used herein according to this well known meaning. U-value herein is reported in terms of $BTU/hr/ft^2/degrees$ F, and may be determined accorded to the guarded hot box method as reported in and according to ASTM designation C1199-91 (incorporated herein by reference). Similarly, R-value is the reciprocal of U-value as explained above.

The R-value for a monolithic glass sheet (one sheet of glass) is typically around 1.0. Moreover, the R-value for an insulating glass (IG) unit with two sheets of uncoated glass spaced apart from each other is typically about 2.0 (i.e., U value of about 0.5). When one of the glass sheets of an IG unit is coated with a low-E (low emissivity) coating, the R value can be increased (e.g., to about 3 or 4). Argon gas between the glass sheets of an IG unit can also increase R-value (and thus decrease U-value).

Conventional IG units often use metal spacer(s) as the edge of the units to space the glass sheets from one another. However, this causes U values to be higher (and thus R values to be lower) at the edges of such IG units due to the conductivity of the metal spacer(s). It would be advantageous to avoid the use of metal spacers at edges of a glass-based window unit, thereby reducing conductivity of the spacing structure. Plastic spacers have been used previously to address this problem, but have resulted in gas (e.g., Ar) leakage through the plastic thereby leading to durability and insulating problems.

In certain example embodiments of this invention, a window unit may be provided which does not necessarily need a metal spacer in an IG unit. In certain example embodiments, a window sash has a spacer function/structure which may be of plastic or the like; e.g., vinyl or some other polymer based material. Thus, in certain example embodiments, part of the sash may separate two glass sheets of the window from one another.

In certain example embodiments of this invention, a window unit may include a vacuum IG (VIG) unit as an inboard lite and a monolithic lite (e.g., with a low-E coating thereon) as an outboard lite. A dead air space may separate the inboard and outboard lites. Moreover, in certain example embodiments, a highly insulated frame may be used to support the inner and outer lites. The VIG unit may be partially embedded or supported (e.g., by from about 1-6 inches, more preferably from about 1 to 3 inches, with an example being about 2 inches) in the insulating frame, so that the insulating frame separates the VIG unit inboard lite from the outboard lite thereby reducing conductivity around the edges of the window unit so that R-value can be increased (and U-value increased). In certain example embodiments, the edges of the inboard and outboard lites may be vertically offset from one another, to further reduce conductivity at edges portions. In certain example embodiments, the total R-value of the window unit is at least about R-8, and more preferably at least about R-10 (compared to the much lower R-values of conventional IG units).

In certain example embodiments, there is provided a window unit comprising: an insulating frame in which a vacuum IG unit and a monolithic lite are provided, the vacuum IG unit including first and second spaced apart glass sheets that are separated from one another via a gap that is a pressure less than atmospheric, and the monolithic lite being spaced apart from the vacuum IG unit; wherein the frame comprises insulating material that separates the vacuum IG unit from the monolithic lite. This embodiment may or may not be used with any other embodiment herein.

In other example embodiments of this invention, there is provided a window unit comprising: an insulating frame in which both an inboard glass lite and an outboard glass lite are partially embedded, the inboard lite comprising a vacuum IG unit including first and second spaced apart glass sheets that are separated from one another via a gap that is a pressure less than atmospheric, and the outboard lite comprising a monolithic glass sheet spaced apart from the vacuum IG unit; wherein the frame comprises insulating material that separates the outer surface of the vacuum IG unit from the inner surface of the monolithic glass sheet; and wherein along at least one of a top edge, a bottom edge, and/or a side edge of the window unit, the outer edge of the monolithic glass sheet is vertically offset from the outer edge of the vacuum IG unit so that the outer edge of the vacuum IG unit is closer to a periphery of the window unit than is the outer edge of the monolithic glass sheet. This embodiment may or may not be used with any other embodiment herein.

In certain example embodiments of this invention, there is provided a vacuum window unit comprising: first, second and third spaced apart glass substrates, wherein a first low pressure space having pressure less than atmospheric pressure is located between the first and second glass substrates, and a second low pressure space having pressure less than atmospheric is located between the second and third glass substrates, the second glass substrate being located between the first and third glass substrates; a plurality of spacers disposed in each of the first and second low pressure spaces; and wherein the second glass substrate has a greater thickness than thickness(es) of the first and third glass substrates. This embodiment may or may not be used with any other embodiment herein.

In other example embodiments of this invention, there is provided a window unit comprising: a vacuum IG unit comprising first and second spaced apart glass substrates, a first low pressure space having pressure less than atmospheric pressure being located between the first and second glass substrates, a plurality of spacers disposed between the first and second glass substrates, and a hermetic edge seal attaching the two substrates to each other; wherein the vacuum IG unit has a bottom side, a top side, and a pair of vertically extending sides; and wherein at least a portion of at least one of the sides of the vacuum IG unit is mounted in a channel or recess defined in a structurally insulated panel, the structurally insulated panel comprising first and second opposing sheets with an insulating material therebetween, wherein at least the portion of the vacuum IG unit in the channel or recess is surrounded by the insulating material of the panel on at least two sides thereof. This embodiment may or may not be used with any other embodiment herein.

In still further example embodiments of this invention, there is provided a window structure comprising: a window comprising at least one glass sheet; and phase change material (PCM) mounted adjacent an interior side of the window, wherein the phase change material is for absorbing heat during sunny conditions and slowly releasing heat during at least cold night time conditions, wherein the phase change material changes phase in a temperature range of from about 50 to 120 degrees F. This embodiment may or may not be used with any other embodiment herein.

In other example embodiments of this invention, there is provided a skylight structure in a building, comprising: a skylight located over a room of a building, wherein a light well passageway extends downwardly from the skylight toward the room; and a vacuum IG unit located at least partially in the light well passageway at an elevation below the skylight. This embodiment may or may not be used with any other embodiment herein.

In further example embodiments of this invention, there is provided a window structure comprising: an IG window unit including first and second spaced apart glass substrates, wherein a viewing area where the window unit can be seen through is defined by a siteline along an outer periphery of the viewing area; substantially transparent insulation provided adjacent the inner and/or outer surface of the IG window unit and extending across the siteline of the window unit so that at least part of the substantially transparent insulation is located in the viewing area of the window unit. This embodiment may or may not be used with any other embodiment herein.

DETAILED DESCRIPTION OF EXAMPLE EMBODIMENTS OF THE INVENTION

Figure 1:
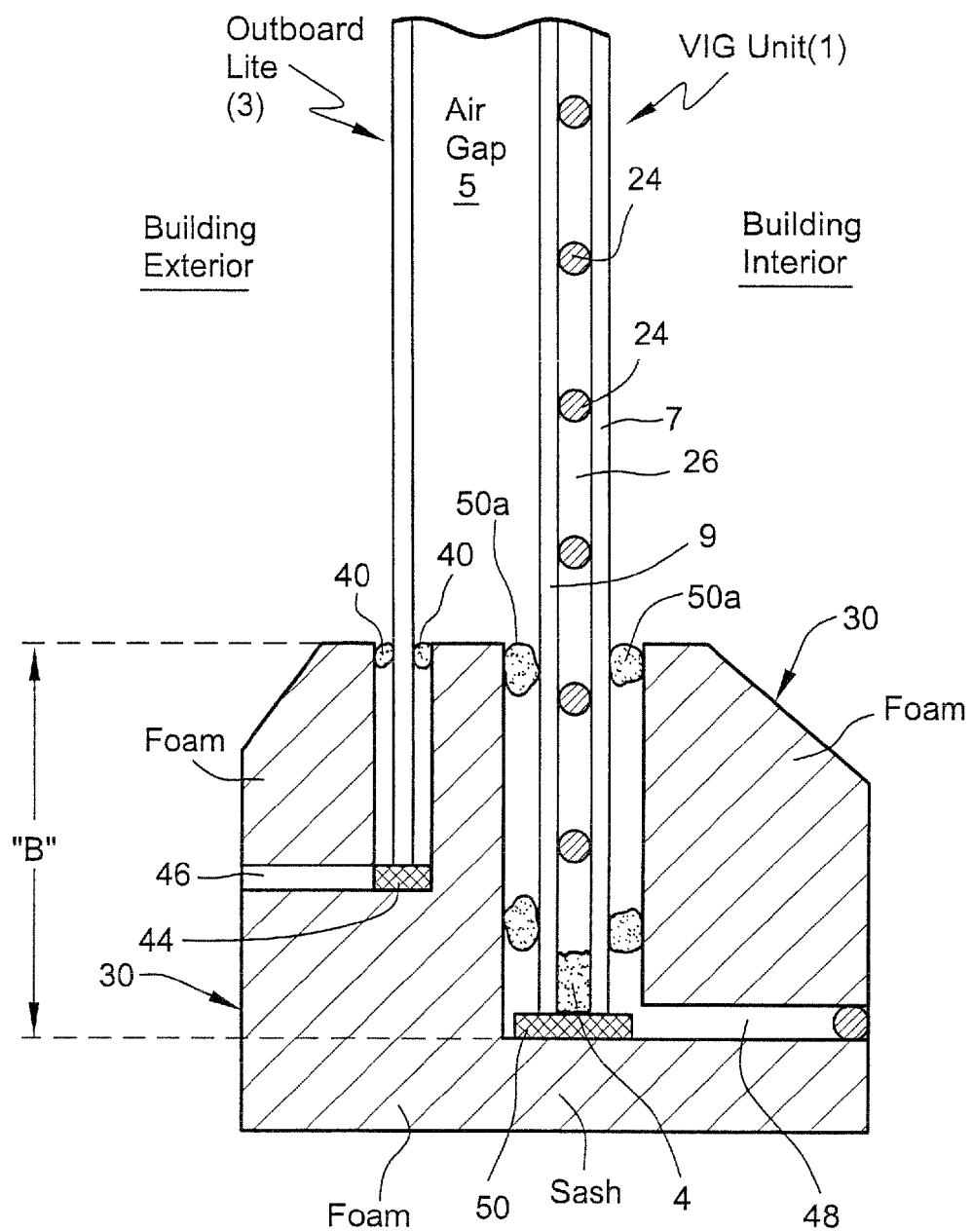
FIG. 1 is a cross sectional view of a window unit according to an example embodiment of this invention.

FIG. 1 is a cross sectional view of a window unit according to an example embodiment of this invention. FIG. 1 illustrates that the window unit includes a vacuum IG (VIG) unit 1 as an inboard lite and a monolithic lite 3 as an outboard lite. A dead air space 5 separates the inboard and outboard lites. Space 5 may be at atmospheric pressure in certain example embodiments, although it may instead be filled with gas and/or at a pressure lower than atmospheric in different example embodiments. In certain example embodiments, a low-E coating for reflecting IR radiation may be provided on the surface of monolithic lite 3 facing the air gap 5, although such a low-E coating is optional in certain example embodiments of this invention. Example low-E coatings are described in U.S. Pat. Nos. 6,936,347, 5,688,585, 5,557,462, 5,425,861, 4,413,877 and 3,682,528, the disclosures of which are all hereby incorporated herein by reference.

The vacuum IG unit 1, which is the inboard lite in FIG. 1, includes an inner glass substrate 7 and an outer glass substrate 9. Edges of opposing vacuum IG substrates 7 and 9 are hermetically sealed by at least one edge or peripheral seal 4. "Peripheral" and "edge" seals herein do not mean that the seal(s) are located at the absolute periphery or edge of the unit, but instead mean that the seal is at least partially located at or near (e.g., within about two inches of) an edge of at least one substrate of the VIG unit. In certain example embodiments, a vacuum IG unit includes first and second opposing glass substrates 7 and 9 (tempered or non-tempered) which are spaced from one another by spacers or pillars 24 which maintain low pressure space 26 between the substrates. In certain example embodiments, substrates 7 and 9 are soda-lime-silica float glass. Hermetic peripheral or edge seal 4, provided between the substrates 7 and 9, seals off low pressure space 26 from surrounding atmospheric pressure. The peripheral/edge seal 4 may be located entirely between the opposing substrates, as shown in FIG. 1. However, the peripheral/edge seal 4 may instead be located partially between substrates 7 and 9, and partially in an L-shaped step area (not shown) at the periphery of the unit in non-illustrated instances where the glass sheets 7 and 9 are of different sizes. The evacuation of space 26 eliminates or reduces heat transport between glass substrates 7 and 9 due to gaseous conduction and convection. In addition, radiative heat transport between substrates 7 and 9 can be reduced to a low level by providing an optional low-E coating(s) on a surface of one or both of sheets 7, 9. High levels of thermal insulation can thus be achieved. Low gaseous thermal conduction may be achieved when the pressure in space 26 is reduced to a level e.g., equal to or below about $0.5 \times 10^{-3}$ Torr, more preferably below about 0.1 mTorr, or $10^{-4}$ Torr, and most preferably below about $10^{-6}$ Torr of atmospheric pressure. The hermetic sealing system 4, including one or more edge seals, substantially eliminates any ingress or outgress of gas or air to/from low pressure space 26. An array of spacers or pillars 24 is provided between substrates 7 and 9 in order to maintain separation of the two approximately parallel glass sheets 7, 9 against atmospheric pressure. In certain embodiments, all spacers 24 are of approximately the same size and/or material. However, in other embodiments, there may be different sizes of spacers 24 in the same vacuum IG unit. In certain embodiments, the density of spacers (i.e., the number of spacers per unit area) may be greater in certain areas than in other areas, or alternatively, the density of the spacers may be approximately uniform throughout the entire unit. For purposes of example only, and without limitation, example VIG units which may be used for VIG unit 1 in the FIG. 1 embodiment are illustrated and/or described in U.S. Pat. Nos. 6,372,312, 6,365,242, 6,399,169, 6,336,984, 6,497,931, and/or 6,692,600, the disclosures of which are all hereby incorporated herein by reference.

In certain example embodiments, a highly insulated foam core insulating frame 30 may be used to support the inner and outer lites 1, 3. In certain example embodiments, the foam functions as insulating so as to provide an insulating function and structure for supporting the lites 1, 3. The insulating frame 30 may be a window sash in certain example embodiments of this invention, and may have a polymer based cover (e.g., vinyl) surrounding a foam core in certain example instances. The VIG unit 1 may be partially embedded or supported (e.g., by from about 1-6 inches, more preferably from about 1 to 3 inches, with an example being about 2 inches) in the foam frame 30, so that the foam inclusive insulating frame 30 separates the VIG unit inboard lite 1 from the monolithic outboard lite 3 thereby reducing conductivity around the edges of the window unit so that R-value can be increased (and U-value increased).

In certain example embodiments, as shown in FIG. 1, the edges of the inboard and outboard lites 1 and 3 may be vertically offset from one another, to further reduce conductivity at edges portions. VIG units tend to have some conductivity between the two glass sheets thereof at the edge area near seal 4. However, the vertical offset between the bottom edge (and possible the upper and/or side edges also) of the VIG unit 1 and that of the monolithic lite 3 helps reduce conductivity between the edges of lites 1 and 3 for the overall window unit thereby improving the R-value thereof. The VIG lite 1 is located on the inboard side in certain example embodiments, so as to avoid temperature swings on the inner side of the window unit and to protect the VIG unit from potential damage from the exterior of the building on which the window unit is located. It is also noted that the fairly long bite "B" between the bottom edge of the VIG unit and the upper edge of the bottom frame portion advantageously makes it more difficult for heat and/or cold to makes its way around the edge of the VIG unit 1 thru the possible solder edge seal 4. The distance of bite "B" is from about 1 to 5 inches, more preferably from about 1-3 inches (e.g., 2 inches) in certain example embodiments of this invention.

In certain example embodiments, the total R-value of the window unit is at least about R-8, and more preferably at least about R-10 (compared to the much lower R-values of conventional IG units).

In the FIG. 1 embodiment, the outer monolithic lite 3 may be glued to the sash/frame 30 via adhesive at area 40 which may also function as a seal. Bottom stop 44 upon which outboard lite 3 rests in first L-shaped channel 46 is optional. L-shaped channel 46 is defined in the frame/sash 30, with the vertical portion of the channel 46 receiving the lite 3 and the horizontal portion of the channel permitting the optional stop 44 to be inserted and/or removed. Glue may also be put in the channel 46 to hold the lite 3 in place. A second L-shaped channel 48 is also provided in the sash or frame 30. Second L-shaped channel 48 is also defined in the frame/sash 30, with the vertical portion of the channel 48 receiving the VIG lite 1 and the horizontal portion of the channel permitting the optional stop 50 to be inserted and/or removed in the frame. Glue may also be put in the channel 48 to hold the VIG lite 1 in place. Again, the VIG lite 1 is held in place via glue at areas 50a in certain example instances.

In order to achieve a high R-value for the overall window unit, one typically has good insulating properties in three primary areas of the window; namely the center of the window (e.g., the daylight opening minus about a 2.5 inches perimeter near the siteline), the edge of the glass (e.g., the 2.5 inch perimeter of the daylight opening near the siteline, and the frame (e.g., the opaque structural component surrounding the glass that holds the glass in place). These three areas act in parallel for heat flow, and one area with very high thermal conductivity will allow undesirable large amounts of heat to flow through that channel. Typically, multiple layers of glass have been used to reduce heat flow through the center of the glass, although low-E coatings and gas such as Ar have also been used. Low conductivity spacers at the perimeter are typically used to reduce conductivity at the edge. Framing is typically designed to hold a glazing unit with an approximately one-half inch bite on the edge of the unit.

The VIG unit 1 uses two sheets of glass 7 and 9 with an optional low-E coating on one of the glass sheets to reach a center-of-glass R-value of about 10 or more. However, the VIG unit 1 may have a solder glass edge seal 4 at or near the perimeter to seal the two glass sheets together, which allows for an easy path for heat to flow from one glass sheet to the other. The window of FIG. 1 however overcomes this problem with the VIG unit by embedding the edge of the VIG unit 1 in the insulating frame/sash 30 with a fairly long bite B. The combination of the insulating properties of glass along the path length around the edge of the VIG unit (two times the bite length) acts as a thermal barrier. The larger bite B results in a larger R-value for the window unit. In certain example embodiments, the frame 30 has a core of highly insulating foam such as polyisocyanurate (e.g., R-6.5 per inch)—two inches of this would provide an R-value of about 13. A protective layer of fiberglass reinforced plastic or wood veneer could also be used as the covering of the foam core, with the structure L-channels 46 and 48 designed to follow the isotheunals of the heat flow in the framing system. The outside surface of the framing system could be expected to reach temperature extremes of −50 degrees F. to plus 150 degrees F., such that the outer skin of the framing may be designed to flex to absorb such temperature extremes without causing significant warping for limited time periods. The outboard monolithic lite 3 helps shield the VIG unit 1 from certain temperature extremes.

In certain example embodiments, the overall window unit of example FIG. 1 may be characterized by the following R-values. First, center of glass: VIG=10, outboard low-E lite=2; total center of glass is about R-12 or more. Second, edge of glass (2.5" perimeter): 4 inch heat path on 4 mm glass is approximately R-6. Third, frame of window: R-13 for foam minus thermal bridging losses of structure R-10. Thus, the combined total thermal resistance of the overall window is approximately R-8 or higher, more preferably about R-10 or higher. The final R-value of the overall window is dependent on the height and width of the window, the thickness of the glass, the depth of the bite "B" on the VIG unit, and the extent of thermal bridging in the frame 30.

Figure 2:
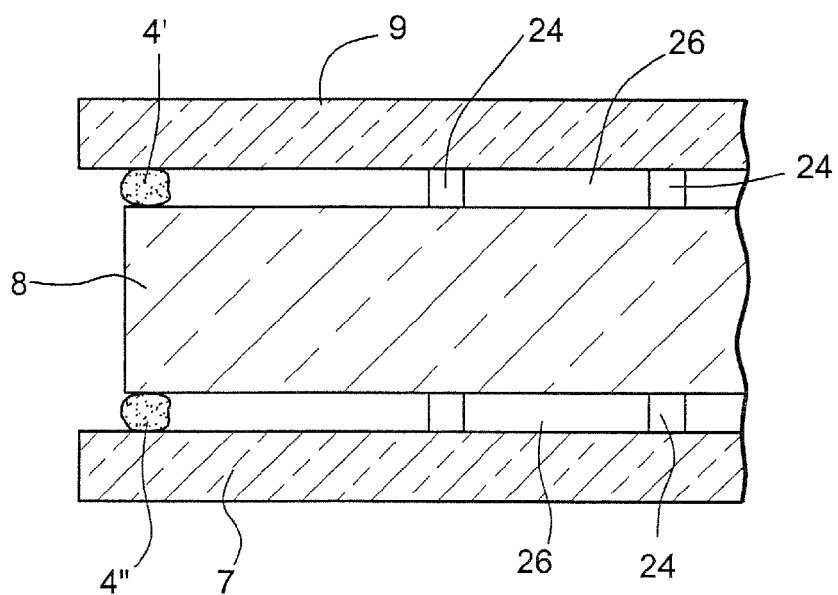
FIG. 2 is a cross sectional view of a window unit according to another example embodiment of this invention.

FIG. 2 is a cross sectional view of a window unit according to another example embodiment of this invention. FIG. 2 illustrates a VIG unit include three different glass sheets 7, 8 and 9. Outer glass sheet 9 is attached to intermediate glass sheet 8 via edge seal 4' (e.g., hermetic seal of solder glass material or the like), whereas the intermediate glass sheet 8 is attached to the inner glass sheet 7 via edge seal 4" (e.g., hermetic seal of solder glass material or the like). As explained above, an array of spacers or pillars 24 is provided between each pair of adjacent glass substrates (between 8 and 9, and also between 7 and 8) in order to maintain separation of each pair of adjacent parallel glass sheets against atmospheric pressure. In certain embodiments, all spacers 24 are of approximately the same size and/or material. However, in other embodiments, there may be different sizes of spacers 24 in the same vacuum IG unit. One or more of the glass sheets 7-9 may have a low-E coating thereon in certain instances. High levels of thermal insulation and low gaseous thermal conduction may be achieved when the pressure in spaces 26 is reduced to a level less than atmospheric; e.g., equal to or below about $0.5 \times 10^{-3}$ Torr, more preferably below about 0.1 mTorr, or $10^{-4}$ Torr, and most preferably below about $10^{-6}$ Torr of atmospheric pressure.

Windows often supply an overabundance of heat to a building interior when in bright sunlight, yet get very cold at night. VIG units help prevent heat loss at night but may still lose heat to the outdoors and feel cold to the touch from the building interior. The FIG. 2 embodiment provides a VIG unit with three glass sheets and an optional low-E coating(s) (e.g., on the respective surfaces of glass sheets 7 and 9 facing the intermediate sheet 8). In certain example embodiments, the intermediate glass sheet 8 is thicker than the other glass sheets 7 and 9. For example, in certain example embodiments, the intermediate glass sheet 8 is at least twice as thick as sheets 7 and 9. In certain example embodiments, the intermediate glass sheet 8 is from about 6 to 20 mm thick, more preferably from about 8-15 mm thick, whereas the other glass sheets 7 and 9 are from about 2 to 5 mm thick, more preferably about 3-4 mm thick. The three sheets 7-9 and low-E coating(s) trap heat on the intermediate pane 8 during daytime hours so that the intermediate sheet 8 area may reach up to about 400 degrees F. during the daytime following exposure to several hours of sunlight. Then, at night, the overall unit would cool down gradually and heat would be gradually released from the intermediate pane 8 area to the indoors (and outdoors). This would allow the inner glass sheet 7 to feel warmer (or less cool) to the touch from the building interior during nighttime hours.

In certain example instances, the intermediate glass sheet 8 of the FIG. 2 embodiment may be made up of a single sheet, or alternatively the sheet 8 may be made up of a plurality of square or rectangular segments (e.g., four inch by four inch segments) to reduce the stresses caused by coefficients of expansion of the intermediate sheet 8 and the large temperature extremes that the sheet 8 may experience due to the FIG. 2 design. It is noted that the FIG. 2 embodiment may be used in connection with the FIG. 1 embodiment, but may also be used in other VIG window unit applications.

Figure 3:
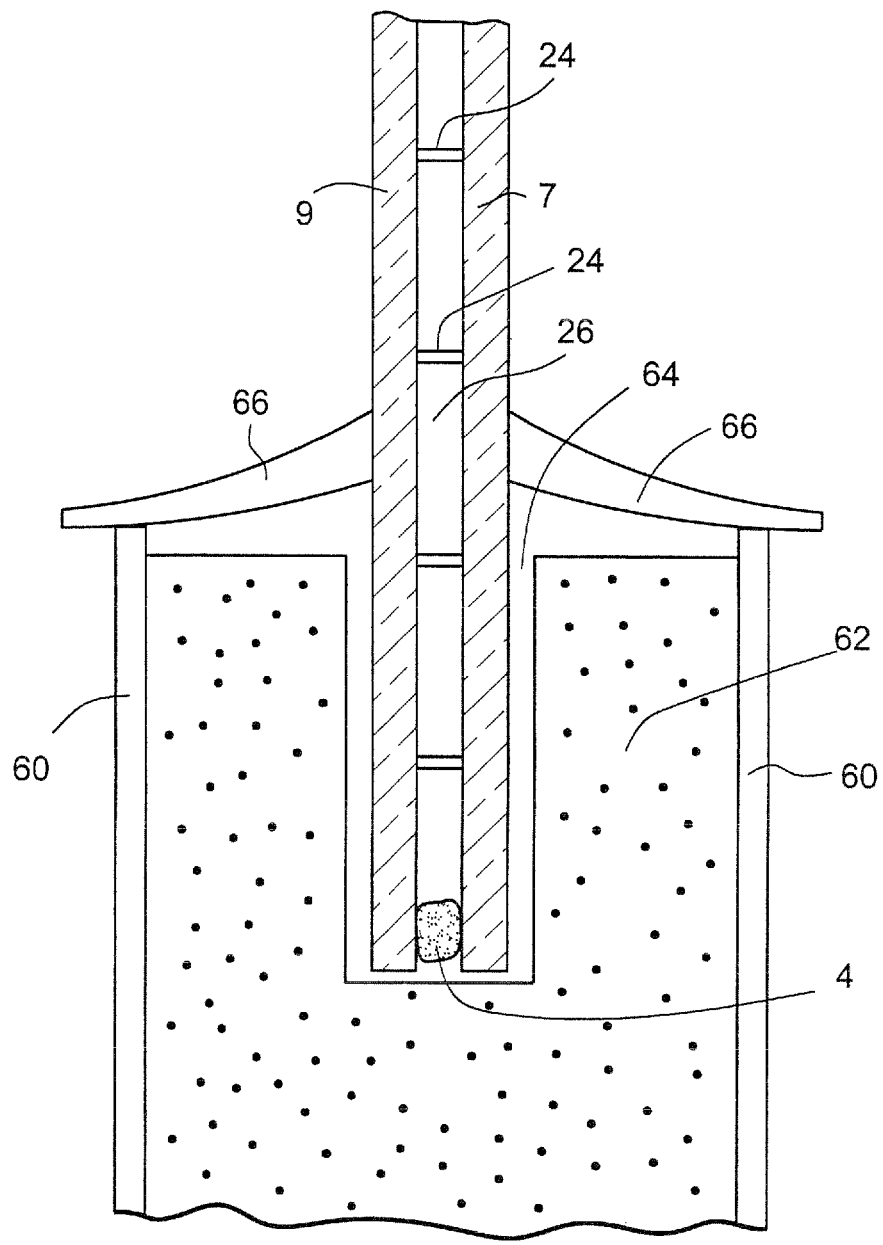
FIG. 3 is a cross sectional view of a window unit according to another example embodiment of this invention.

FIG. 3 illustrates another example embodiment of a window unit according to this invention. In the FIG. 3 embodiment, a two-paned VIG unit is provided. The glass sheets 7, 9, spacers or pillars 24, low pressure space 26 and hermetic edge seal 4 has been discussed above with respect to the FIG. 1 and FIG. 2 embodiments. In the FIG. 3 embodiment, the bottom (and possibly the top and both sides) of the VIG unit is used in combination with at least one structurally insulated panel (SIP). The SIP includes oriented strand board (OSB) sheets 60 that are aligned approximately parallel to the glass sheets 7, 9 of the VIG unit, and insulation such as foam insulation 62 located between the OSB sheets 60 and the VIG unit. A cut-out or recess 64 is defined in the top surface of the insulation 62, and the bottom edge (and possibly the top and both side edges) of the VIG unit is received in this cut-out or recess 64 as shown in FIG. 3. Glue or other filler (not shown) may optionally be provided in the recess 64 between the VIG unit and the insulation 62 in certain example embodiments. Trim 66 may be used to aesthetic purposes.

In the FIG. 3 embodiment, the use of the SIP having a channel that receives at least one edge of the VIG unit is advantageous in that it permits a higher R-value to be realized for the window unit. Note that conventional sashes and/or frames may be eliminated in the FIG. 3 embodiment. The window provides for high thermal insulation values for a wall, as well as a clear vision through the glazing. Solar gain may also be allowed to offset heating load in winter seasons. In certain example embodiments, the window may realize an R-value of at least R-8, and more preferably at least R-10. Higher R-values may be realized using two VIG units instead of the one illustrated in the FIG. 3 embodiment; higher R-values such as R-20 or R-30 may be realized using two VIP units and edge bites of up to 12 inches or so for example, instead of the one illustrated in the FIG. 3 embodiment.

Figure 4:
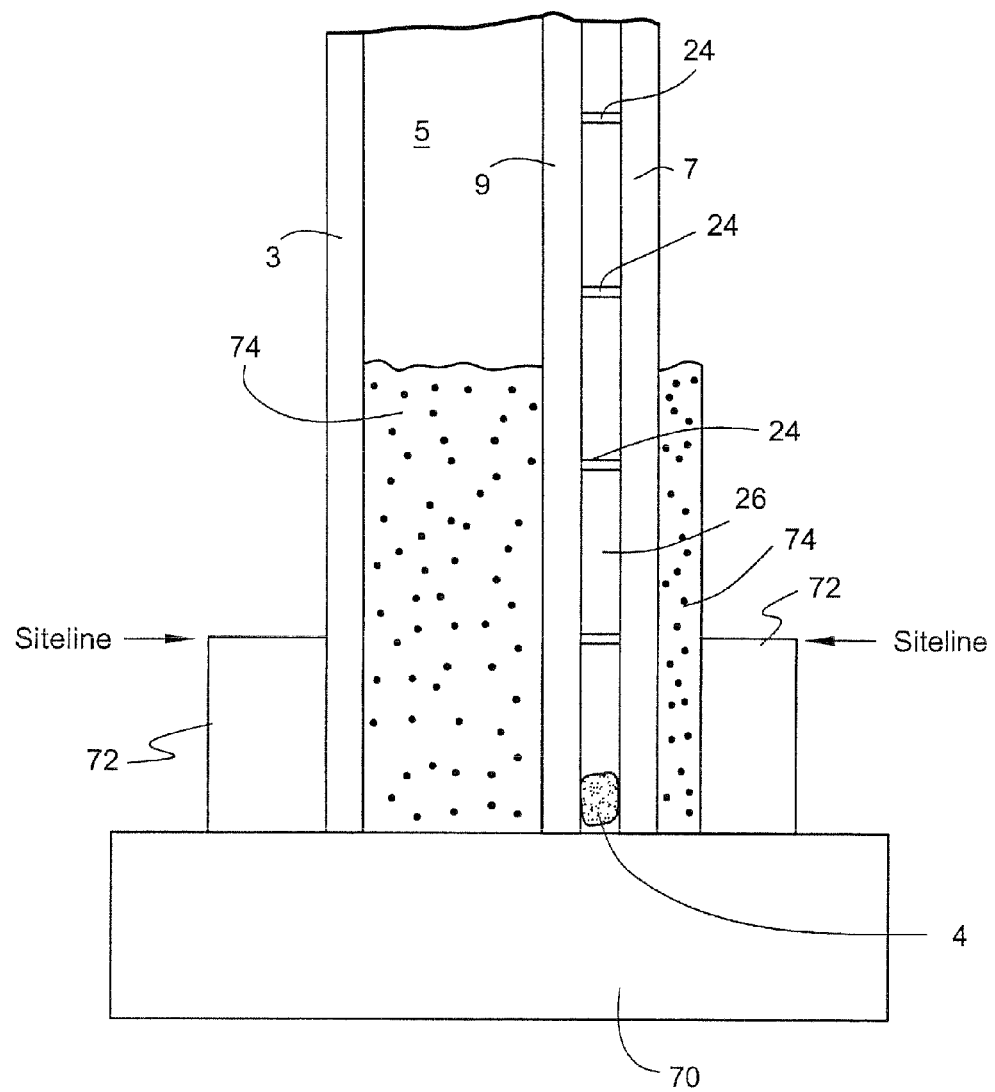
FIG. 4 is a cross sectional view of a window unit according to another example embodiment of this invention.

FIG. 4 is a cross sectional view of yet another window unit according to another example embodiment of this invention. Conventional VIG units have very high insulating values at the center of the glass, but have lower insulating values at the edges since the two glass sheets are often sealed with solder glass. Thus, conventional VIG units have glass edges which permit heat loss around the perimeter of the unit. When installed into a standard sash or window frame, the area near the siteline tends to be very cold (in winder) and may be susceptible to moisture condensation and heat loss to the outdoors. In the FIG. 4 embodiment of this invention, substantially transparent insulation is provided around at least part of the perimeter area of the VIG unit near the site line so as to allow good vision while also increasing the path length of the glass edge thereby reducing heat loss. The FIG. 4 embodiment includes a VIG unit including glass sheets 7, 9, spacers or pillars 24, low pressure space/gap 26, and hermetic edge seal 4 which may be of solder glass or the like. Again, example VIG units which may be used are illustrated and/or described in U.S. Pat. Nos. 6,372,312, 6,365,242, 6,399,169, 6,336,984, 6,497,931, and/or 6,692,600, the disclosures of which are all hereby incorporated herein by reference. The VIG unit is mounted on frame 70 and is held from lateral movement by stops 72. The stops 72 may or may not be integrally formed with the frame 70. The addition of transparent insulation 74 between the VIG unit and the outboard glass lite 3, and interior of the VIG unit (i.e., on both sides of the VIG unit) is advantageous in that is provided near the siteline area of the window unit and extends from the siteline toward the central area of the window so as to increase the heat flow path of the glass edges of the VIG unit. The window thus has a lower heat loss and less chance of moisture condensation near the siteline. In certain example embodiments of this invention, the substantially transparent insulation 74 may be of or include Aerogel insulation, which comprises $SiO_2$ in board form or the like. The substantially transparent insulation 74 may be formed by reacting two or more organics to form an inorganic $SiO_2$ inclusive or based network in board form or otherwise. The insulation 74 may be at least 50% transparent, more preferably at least 70% transparent, in certain example embodiments of this invention. It is noted that outboard lite 3 is optional in the FIG. 4 embodiment.

Figure 5:
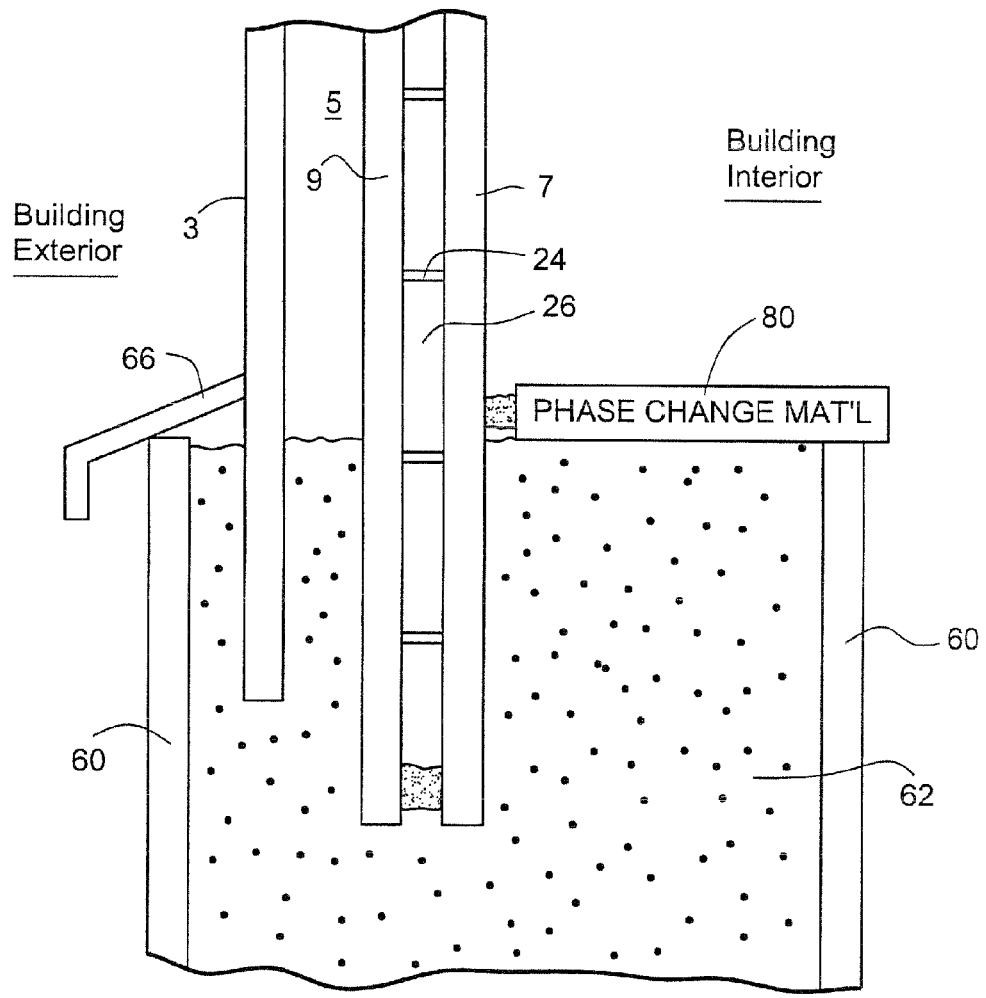
FIG. 5 is a cross sectional view of a window unit according to another example embodiment of this invention.

FIG. 5 is a cross sectional view of a window unit according to yet another example embodiment of this invention. Glazings such as IG units are often thermally uncomfortable in certain weather. For example, a glazing may be too cold during winter nights, to the touch from a building interior. In the FIG. 5 embodiment, a phase change material (PCM) is provided interior of the inner glass sheet of the IG unit to make the window unit more thermally comfortable to the touch during winter night conditions. The PCM can absorb heat on sunny days for example, and gradually release the energy/heat at night so that the inner surface of the IG unit does not becomes as cold during winter night-time conditions.

The FIG. 5 embodiment includes a VIG unit including glass sheets 7, 9, spacers or pillars 24, low pressure space/gap 26, and hermetic edge seal 4 which may be of solder glass or the like (see discussions above of VIG units). Again, example VIG units which may be used are illustrated and/or described in U.S. Pat. Nos. 6,372,312, 6,365,242, 6,399,169, 6,336,984, 6,497,931, and/or 6,692,600, the disclosures of which are all hereby incorporated herein by reference. The FIG. 5 window unit may also optionally include outboard lite 3 discussed above. In the FIG. 5 embodiment, it is possible for the bottom (and possibly the top and both sides) of the VIG unit (and/or the monolithic lite 3) to be mounted in at least one structurally insulated panel (SIP) which includes oriented strand board (OSB) sheets 60 that are aligned approximately parallel to the glass sheets 7, 9 of the VIG unit, and insulation such as foam insulation 62 located between the OSB sheets 60 and the VIG unit. A cut-out or recess may be defined in the top surface of the insulation 62, and the bottom edge (and possibly the top and both side edges) of the VIG unit (and/or the lite 3) is received in this cut-out(s) or recess(s) as shown in FIG. 5. Trim 66 may be used to aesthetic purposes. The use of the SIP having a channel that receives at least one edge of the VIG unit is advantageous in that it permits a higher R-value to be realized for the window unit.

Still referring to the FIG. 5 embodiment, phase change material 80 is provided on the interior side of the innermost lite of the window unit. Instead of using conventional light weight materials, the sill and/or jamb trim pieces on the interior of the window may be made of a structure or material that contains phase change material (PCM) 80. The PCM absorbs large amounts of heat near a temperature (e.g., about 70-100 degrees F., more preferably from about 80-90 degrees F.), and store such energy during sunny days. Moreover, the PCM stays close to this temperature range at night (when the outside temperature drops even further) while slowly releasing the heat. Due to the positioning of the PCM 80 just interior of the inner side of the window unit in the FIG. 5 embodiment, the heat released by the PCM at night keeps the interior surface of the window unit from becoming too cold during certain conditions and is advantageous in this respect. In certain example embodiments, the PCM may be formed above the insulation 62, and/or may be used in place of a window sill or jamb. Another example PCM that may be used is wax-60 which changes from a solid state to a liquid state between 53-60 degrees C. Another example PCM that may be used is a paraffin wax (or eutectoid Glauber salt) such as $H_2O$, $Na_2S_2 + 5H_2O$, Neopentyl glycol, etc. PCMs that change from a liquid state to a solid state absorb a relatively large amount of heat with a minimal change in volume, although it is noted that other types of PCMs can be used in different embodiments of this invention. Yet other example PCMs that may be used are palmitic acid, naturally occurring fatty acids (soaps) with melting points from 70 to 110 degrees F., stearic acids, myristic acids, cetyl alcohol. The PCM 80 may be encased in a flexible casing in certain example embodiments of this invention.

It is noted that large edge bites on a VIG unit can reduce high stresses imposed on a glazing due to extreme temperature differences between indoor and outdoor temperatures. This would reduce the likelihood of glass fracturing in extreme climates. Moreover, the outboard monolithic lite (3) may be used also to reduce the indoor to outdoor temperature difference. In addition, large edge bites on a VIG can reduce the relative area of the very cold glass (outer VIG pane) to the much warmer glass (indoor VIG pane). Furthermore, the stresses may be distributed more uniformly across the large edge area of the window unit.

As an alternative to the illustrated FIG. 5 embodiment of this invention, the insulation 62 adjacent the interior surface of inner glass sheet 7 may be replaced with a PCM. In other words, the PCM may extend downward from the area where 80 is illustrated in FIG. 5 all the way, or part way, to the bottom of the VIG unit. This would provide further insulation and help keep the window unit even warmer during winter night conditions. In certain example instances, the PCM may be made up of a plurality of PCM particles or pellets suspended in water or some other solution, encased in a plastic or other casing. An example phase change temperature would be from about 50 to 120 degrees F., more preferably from about 70 to 100 degrees F., more preferably from about 80 to 90 degrees F. While such a PCM may be provided only on the interior surface of the VIG unit in certain example embodiments, it is possible for the PCM to also be located adjacent an exterior surface of the VIG unit near where insulation 62 is shown in the FIG. 5 embodiment in still further alternative embodiments of this invention. The PCM material may also be substantially transparent in certain example embodiments of this invention.

Figure 6:
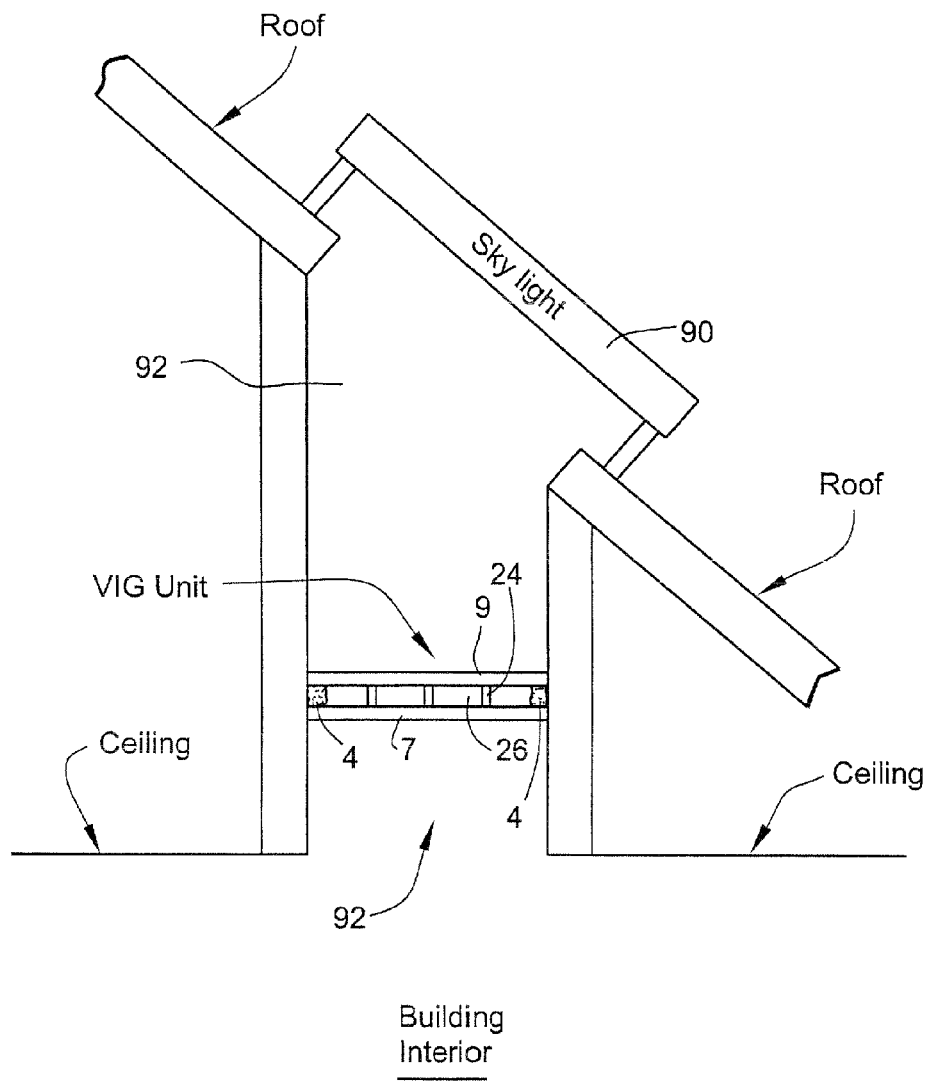
FIG. 6 is a cross sectional view of a window unit according to another example embodiment of this invention, which may include a VIG unit used in conjunction with a skylight structure.

FIG. 6 illustrates a skylight structure in a building such as a home according to another example embodiment of this invention. The skylight structure includes a transparent skylight located proximate the roof of the building and a passageway 92, typically vertically extending, leading from the interior of the building upward above a room ceiling toward the skylight 90. Conventional skylights are often supplied as one packaged glazing system that is installed on the roof of a residence. In winter months, heat from the building travels upward through the passage 92 (or light well) and escapes through the glazing 90, frame, curb and even the walls of the passage 92. Moreover, there is potential for condensation to occur on these components. Winter U-factors of skylights are not as good as vertical glazings, so code requirements are more lenient for them.

In the FIG. 6 embodiment of this invention, a VIG unit is installed across the passage or light well 92, between the room ceiling and the skylight 90. The VIG unit including glass sheets 7, 9, spacers or pillars 24, low pressure space/gap 26, and hermetic edge seal 4 which may be of solder glass or the like (see discussions above of VIG units). Again, example VIG units which may be used are illustrated and/or described in U.S. Pat. Nos. 6,372,312, 6,365,242, 6,399,169, 6,336,984, 6,497,931, and/or 6,692,600, the disclosures of which are all hereby incorporated herein by reference. The VIG unit may be mounted at the ceiling interface or above in different example embodiments of this invention. The use of the VIG unit in the light well 92 of the skylight is advantageous in that it provides an improved thermal barrier that prevents heat from being lost through the skylight 90 or light well 92 during winter months. R-values may improve from about 2 to 10 in certain example instances.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A window unit comprising:
   a vacuum IG unit comprising first and second spaced apart glass substrates, a first low pressure space having pressure less than atmospheric pressure being located between the first and second glass substrates, a plurality of spacers disposed between the first and second glass substrates, and a hermetic edge seal attaching the two substrates to each other;
   wherein the vacuum IG unit has a bottom side, a top side, and a pair of vertically extending sides;
   wherein at least a portion of at least one of the sides of the vacuum IG unit is mounted in a channel or recess defined in a structurally insulated panel, the structurally insulated panel comprising first and second opposing sheets with an insulating material therebetween, wherein at least the portion of the vacuum IG unit in the channel or recess is surrounded by the insulating material of the panel on at least two sides thereof; and
   a phase change material provided on an interior side of the vacuum IG unit but not on an exterior side of the vacuum IG unit, the phase change material being supported by the structurally insulated panel.

2. The window unit of claim 1, wherein the insulating material is foam.

3. The window unit of claim 1, wherein the first and second opposing sheets of the structurally insulated panel comprise oriented strand boards.

\* \* \* \* \*